(12) United States Patent
Kaasa et al.

(10) Patent No.: US 10,317,109 B2
(45) Date of Patent: Jun. 11, 2019

(54) SUBSEA HEAT EXCHANGER AND METHOD FOR TEMPERATURE CONTROL

(75) Inventors: Baard Kaasa, Ranheim (NO); Bernt Henning Rusten, Jakobsli (NO); Arne Olav Fredheim, Trondheim (NO); Knut Arild Maråk, Trondheim (NO); Gunleiv Skofteland, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 531 days.

(21) Appl. No.: 14/128,582

(22) PCT Filed: Jul. 1, 2011

(86) PCT No.: PCT/EP2011/061149
§ 371 (c)(1),
(2), (4) Date: Apr. 30, 2014

(87) PCT Pub. No.: WO2013/004277
PCT Pub. Date: Jan. 10, 2013

(65) Prior Publication Data
US 2014/0246166 A1    Sep. 4, 2014

(51) Int. Cl.
*F28D 1/06* (2006.01)
*F28D 15/00* (2006.01)
(Continued)

(52) U.S. Cl.
CPC ............ *F24T 10/00* (2018.05); *E21B 36/001* (2013.01); *F28D 1/06* (2013.01); *F28D 7/024* (2013.01);
(Continued)

(58) Field of Classification Search
CPC ......... Y02E 10/30; Y02E 10/34; F28D 1/022; F28D 1/06; F28D 7/024; F28D 15/00
See application file for complete search history.

(56) References Cited

U.S. PATENT DOCUMENTS 3,158,010 A    11/1964  Kuerston
3,312,054 A  *  4/1967  Anderson ............... F01K 15/04
                                              310/306
(Continued)

FOREIGN PATENT DOCUMENTS

EP    0080090 A1    6/1983
EP    2333431 A2    6/2011
(Continued)

OTHER PUBLICATIONS

International Search Report received for PCT Patent Application No. PCT/EP2011/061149, dated Mar. 13, 2012, 4 pages.
(Continued)

*Primary Examiner* — Frantz F Jules
*Assistant Examiner* — Nelson J Nieves
(74) *Attorney, Agent, or Firm* — Wenderoth, Lind & Ponack, L.L.P.

(57) ABSTRACT

A subsea heat exchanger for cooling or heating a hydrocarbon-containing fluid includes a convection section enclosed by a shell or enclosure comprising, one or more heat exchanging fluid inlet(s) and outlet(s), one or more hydrocarbon-containing fluid inlet(s) and outlet(s), and one or more fluid carrying convection tube(s) adapted for heat transfer between the hydrocarbon-containing fluid on the inside of the tube(s) and a surrounding heat exchanging fluid on the opposite side of the tube(s). The heat exchanger also includes one or more flow regulating device(s) for controlling the hydrocarbon-containing fluid outlet temperature. The heat exchanging fluid circulates in a closed circuit for heat transfer both with said hydrocarbon-containing fluid and with surrounding sea water on the outside of the enclosure.

19 Claims, 5 Drawing Sheets

(51) Int. Cl.
  *E21B 36/00* (2006.01)
  *F24T 10/00* (2018.01)
  *F28D 7/02* (2006.01)
  *F28F 27/00* (2006.01)

(52) U.S. Cl.
  CPC .............. *F28D 15/00* (2013.01); *F28F 27/00* (2013.01); *Y02E 10/10* (2013.01)

(56) References Cited

U.S. PATENT DOCUMENTS

| | | | | |
|---|---|---|---|---|
| 3,452,701 A * | 7/1969 | Lane | ...................... | B63H 25/38 114/162 |
| 3,504,741 A * | 4/1970 | Talley, Jr. | .............. | E21B 43/017 166/267 |
| RE27,308 E * | 3/1972 | Leonard | .................. | E21B 43/36 166/267 |
| 4,104,883 A * | 8/1978 | Naef | ......................... | F01K 9/00 165/104.13 |
| 4,186,311 A * | 1/1980 | Humiston | .................. | C02F 1/02 290/1 R |
| 4,531,570 A * | 7/1985 | Dries | ........................ | B04C 5/14 165/104.16 |
| 5,452,580 A * | 9/1995 | Smith | ........................ | F03G 7/04 60/531 |
| 6,245,955 B1 * | 6/2001 | Smith | ........................ | C10L 3/00 585/15 |
| 6,564,011 B1 * | 5/2003 | Janoff | ....................... | E21B 36/04 392/479 |
| 2002/0120172 A1 * | 8/2002 | Waycuilis | ................ | B01J 8/007 585/15 |
| 2003/0182948 A1 * | 10/2003 | Nierenberg | ............... | F17C 5/06 62/50.2 |
| 2007/0289303 A1 * | 12/2007 | Prueitt | ...................... | F03G 7/05 60/641.7 |
| 2008/0277492 A1 * | 11/2008 | Cannon | .................. | A01G 15/00 239/14.1 |
| 2008/0302511 A1 * | 12/2008 | Kragt | ........................ | F28D 7/16 165/95 |
| 2008/0314043 A1 * | 12/2008 | Howard | ................ | F01K 25/106 60/641.7 |
| 2009/0077969 A1 * | 3/2009 | Prueitt | .................... | B01B 1/005 60/641.7 |
| 2009/0294110 A1 * | 12/2009 | Foust | ........................ | F03G 7/05 165/152 |
| 2009/0295167 A1 | 12/2009 | Clidaras et al. | | |
| 2010/0139272 A1 * | 6/2010 | Howard | ..................... | F24J 3/06 60/641.7 |
| 2010/0206573 A1 * | 8/2010 | Paulus | .................... | B63B 35/44 166/335 |
| 2010/0252227 A1 * | 10/2010 | Sten-Halvorsen | .... | E21B 36/001 165/45 |
| 2010/0275596 A1 * | 11/2010 | Labelle | .................. | E21B 7/185 60/641.2 |
| 2011/0079375 A1 * | 4/2011 | Nagurny | ................ | F28D 1/022 165/166 |
| 2011/0083827 A1 | 4/2011 | Salyer | | |
| 2012/0168142 A1 * | 7/2012 | Hernandez | ........... | E21B 36/001 165/279 |
| 2012/0285656 A1 * | 11/2012 | Moore | .................. | F25J 1/0022 165/45 |

FOREIGN PATENT DOCUMENTS

| | | |
|---|---|---|
| WO | 2008/147219 A2 | 12/2008 |
| WO | 2010/002272 A1 | 1/2010 |

OTHER PUBLICATIONS

International Preliminary Report on Patentability received for PCT Patent Application No. PCT/EP2011/061149, dated Jan. 16, 2014, 7 pages.

* cited by examiner

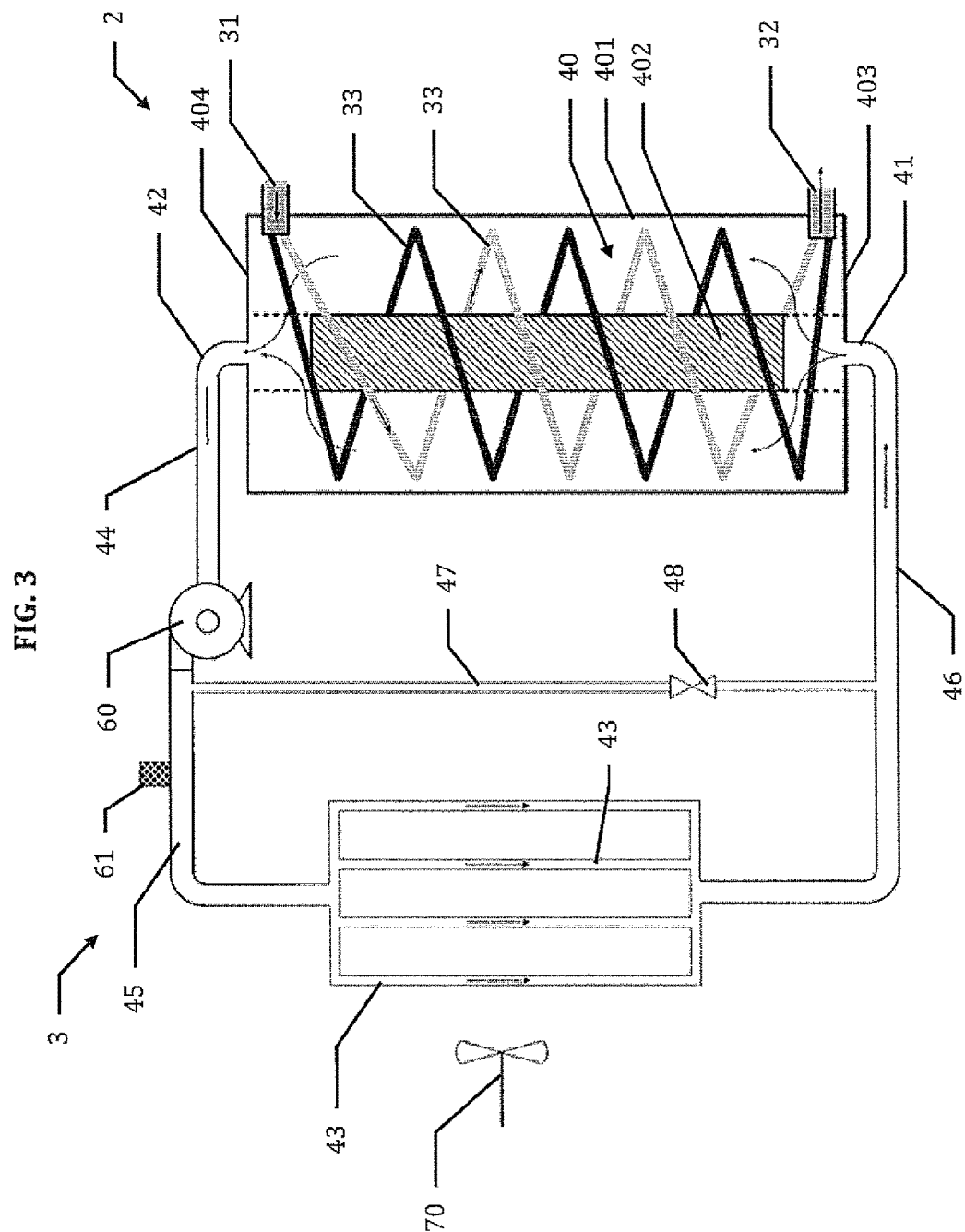

SUBSEA HEAT EXCHANGER AND METHOD FOR TEMPERATURE CONTROL

CROSS REFERENCE TO RELATED APPLICATIONS

This application is a U.S. National Phase Patent Application of PCT/EP2011/061149, filed on Jul. 1, 2011, which is hereby incorporated by reference in the present disclosure in its entirety.

FIELD OF THE INVENTION

The invention relates to a subsea heat exchanger unit with output temperature control, and especially a convection heat exchanger for the cooling or heating of a produced hydrocarbon containing fluid stream, such as from one or more subsea wells, and methods for such temperature control.

BACKGROUND

The temperature of a produced hydrocarbon containing stream at subsea level is generally hot and may normally vary in temperatures in the range of 30-150° C. at the prevailing pressures. In order to process or transport such a hot hydrocarbon fluid stream, it may be necessary to regulate the temperature of the stream, such as by cooling the stream to a specific temperature, e.g. in the range of 0-60° C.

A number of existing oil coolers located on the seabed are not controllable and have the limitation of only cooling the oil from a well stream after separation of gas the phase. Such coolers are used to reduce the temperature of the oil either because of pipeline temperature restrictions or for other reasons.

There is also a small number of gas coolers installed subsea.

A known type of subsea coolers consists of bundles of steel tubes in which the warm process stream flows. Seawater at approximately 4° C. freely flows across the outside of the tubes, directly cooling the process stream by heat dissipating through the steel tube walls to the surrounding seawater. The amount of cooling strongly depends on the sea current, as the heat transfer is increased multiple times if there is a strong sea current. In this way, the outlet temperature of the process stream is given by uncontrollable variables. For some applications where any additional cooling is considered an advantage, this may be satisfactory.

However, hydrocarbon fluids may develop wax and hydrate depositions when cooled down below certain temperatures. A build up of wax and/or hydrate depositions inside tubes or process equipment will reduce the capacity of said parts and in worst case lead to blocking which stops productions and is both time consuming and costly to remove. Hence, uncontrolled cooling of hydrocarbon fluids at subsea is undesirable, as the outlet temperature of such coolers may result in undesirable process conditions, such as temperatures below the wax or hydrate formation temperature in the fluid.

In a more elaborate subsea processing system than oil cooling or gas compression, e.g. for future controllable water knock-out or hydrocarbon dew-point control, the outlet temperature of a subsea heat exchanger needs to be controllable. This will enable the temperature of the outlet process stream to be fixed, independently of changing flow streams, flow temperatures, sea temperature and sea current.

A temperature control of hydrocarbon containing process streams will also be advantageous for hydrate control as there is a risk in subsea systems of having areas cooled down below hydrate temperature (typically 20-30° C.). To avoid deposits such as hydrates, below said temperatures, hydrate inhibitors are added to the stream. Conventional hydrate inhibitors may be an alcohol (methanol or ethanol) or a glycol such as Monoethylene Glycol (MEG or 1,2-ethanediol), which is inexpensive and simple to inject. However, the amount of hydrate inhibitor needed is proportional to the water content of the stream and at high levels will require a hydrate inhibitor regeneration process at the receiving end.

By controlling the flow of water across the tube bundle carrying a hydrocarbon containing stream, control of the outlet temperature of the cooler might be provided. The current suggested manner to do this is to enclose the tube bundle in an enclosure (large tank, shell or jacket) with openings in each end for through-flow of seawater. The amount of seawater entering/exiting the tank, i.e. the seawater flow across the tube bundle, may be controlled in order to adjust the heat transfer coefficient and hence the outlet temperature of the hydrocarbon-containing stream.

WO 2008/147219, (FMC Kongsberg Subsea), concerns a subsea cooling unit having an inlet for a hot fluid and an outlet for cooled fluid, the cooling unit comprising a number of coils exposed to seawater, and means for generating a flow of seawater past the coils, where the means for generating the flow of seawater comprises a propeller and a rotatable actuator and wherein the cooler is enclosed in a duct.

WO 2010/002272, (Aker Subsea AS), concerns a subsea convection heat exchanger for cooling or heating a hydrocarbon-containing fluid in subsea environment. The heat exchanger comprises a convection section with a fluid carrying pipe adapted for heat transfer between the carried hydrocarbon fluid on one side of the pipe wall and the surrounding water on the opposite side of the pipe wall. The convection section is enclosed by an enclosure with a seawater inlet and a seawater outlet and the heat exchanger is provided with means for controlled through-flow of the surrounding seawater from the seawater inlet to the seawater outlet.

Hence, the documents above describe a control mechanism for adjusting the seawater flow across the tube bundle using a propeller or a pump respectively.

U.S. Pat. No. 3,158,010 concerns a heat exchanger with helically coiled tube bundles.

The use of seawater for the direct cooling of tubes carrying the relative hot hydrocarbon containing fluids can give rise to unwanted scaling and marine growth or bio fouling. Scaling may occur on surfaces of high temperatures in seawater, such as 60° C. and above, by deposition of inorganic compounds, such as $CaCO_3$ and $CaSO_4$. Bio fouling or growth may occur on any subsea equipment, but is enhanced by warm temperatures, such as on the warm tubes of a heat exchanger. In addition, high temperatures increase the risk of corrosion of the cooling tubes, which may lead to leaks and malfunction.

Scale formation and fouling on tube walls reduces the efficiency of the heat transfer by the formation of an insulating film or layer on the seawater side of the tube surfaces and may in addition induce corrosion. The formation of such layers not only reduces the heat transfer and the heat exchanger efficiency, but may also narrow the passage way for the sea water flow. These effects may both call for increased seawater through put, such as by increased pump capacity or an over-sizing of the heat exchanger to compensate for a reduction in total heat transfer. Alternatively a regular cleaning of the surfaces exposed to such scaling and fouling may be needed.

The heat exchangers suggested in prior art with controllable output temperature are subject to the mentioned scaling and fouling. Due to the encasements of the tube bundles, wherein seawater is contacted with the warm hydrocarbon carrying tubes, are difficult or impossible to clean physically. In addition, the use of biocides and/or anti-scale chemicals for removing such scaling and fouling is unwanted due to the difficulty in handling such substances at subsea level in safe and controlled fashion with regards to environmental concerns.

Hence there is a need for a subsea heat exchanger with output temperature control, which is not subject or less prone to the concerns of the heat exchangers of prior art.

SUMMARY AND OBJECT OF THE INVENTION

The present invention concerns a subsea heat exchanger and a method for temperature control by subsea cooling or heating of a hydrocarbon containing fluid.

The heat exchanger of the present invention is able to cool or heat any hydrocarbon containing fluid in both a liquid and/or gas phase possibly containing water in various degrees.

Specifically, the heat exchanger may be designed for cooling a hydrocarbon containing gas, which prior has been separated off from a multiphase well stream by a separator, down to a temperature as low as possible to knock out water, but not into the hydrate forming temperature region. Condensed liquids of water and condensate may be separated from said gas by a second separator, such as a condensed water scrubber providing a second gas phase, enhanced for transport over large distances possibly with the addition of a limited amount of hydrate inhibitor, which amount is significantly lower than the amount necessary for transport of the first separated gas phase.

In one aspect the invention concerns a subsea heat exchanger for cooling or heating a hydrocarbon-containing fluid, said heat exchanger comprising;
- a convection section enclosed by a shell or enclosure comprising:
  - one or more heat exchanging fluid inlet(s) and outlet(s);
  - one or more hydrocarbon-containing fluid inlet(s) and outlet(s); and
  - one or more fluid carrying convection tube(s) adapted for heat transfer between the hydrocarbon-containing fluid on the inside of the tube(s) and a surrounding heat exchanging fluid on the opposite side of the tube(s), wherein the heat exchanger is provided with one or more flow regulating device(s) for controlling the hydrocarbon-containing fluid outlet temperature, wherein the heat exchanging fluid circulates in a closed circuit for heat transfer both with said hydrocarbon-containing fluid and with surrounding sea water on the outside of the enclosure.

The flow-regulating device may be a pump or a compressor regulating the flow rate of heat exchanging fluid and further, the convection tube(s) inside the convection section are coiled in a helical manner. In addition, the heat exchanger may be positioned vertically, optionally for ease of draining.

Further, the closed circuit may comprise one or more external convection pipes adapted for heat transfer between the heat exchanging fluid on the inside of the tube(s) and surrounding sea water on the opposite side of the tube(s). In the case of two or more external convection pipes, they may be arranged in one of: a free standing parallel arrangement in a horizontal, vertical or slanted arrangement; a helical arrangement in a free standing manner; or coiled around the heat exchanger enclosure.

In addition, the flow regulating device may be a propeller or ejector for increasing flow of surrounding seawater across the external convection pipes, optionally wherein the convection pipes are bundled within an open ended cylindrical casing.

The hydrocarbon-containing fluid and heat exchanging fluid may flow in a co-current or counter current manner and/or the heat exchanging fluid flow can be reversed.

The external convection pipes and/or the internal convection pipes may be equipped with an electrical heating for preventing scaling or growth.

The heat exchanger may comprise a distribution header at the inlet of the hydrocarbon containing fluid, optionally for distributing gas and liquid phase hydrocarbon-containing fluid in equal ratios in all internal convection tubes.

The closed convection circuit may comprise a bypass circuit bypassing the external convection pipes and the flow regulating device may also be a valve in the bypass circuit regulating the mixing rate of heat exchanging fluid passing through the external convection pipes and the bypass.

The fluid in the closed convection circuit may in some cases be mainly a gas and flow device may hence be a compressor wherein the closed circuit comprises an expansion valve, optionally at the heat exchanger fluid inlet of the convection section.

In another aspect, the invention concerns a method for subsea cooling or heating of a hydrocarbon containing fluid comprising:
- passing said hydrocarbon containing fluid through one or more convection tubes in an enclosed convection section of a subsea heat exchanger; and
- passing a heat exchanging fluid around said convection tubes within said enclosed convection section in order to cool or heat the hydrocarbon containing fluid;

and circulating said heat exchanging fluid in a closed circuit through seawater on the outside of the enclosed convection section in order to cool or heat the heat exchanging fluid before entering the enclosed convection section of the heat exchanger again.

The temperature of the hydrocarbon containing fluid leaving the convection section of the heat exchanger may be regulated by the flow rate of the heat exchanging fluid, optionally by a pump or a compressor.

The heat exchanging fluid may be passed through one or more external convection pipes of the closed circuit in seawater on the outside of the enclosed convection section. Also, the temperature of the hydrocarbon containing fluid leaving the convection section of the heat exchanger may be regulated by forcing a current of seawater around said external convection pipes, optionally by a propeller or ejector.

Some of the heat exchanging fluid passing in the closed circuit through seawater may be passed through a bypass line, bypassing the one or more external convection pipes, and wherein the mixing rate is regulated by at least one valve in the bypass line and/or the line comprising the external convection pipe(s). Hence, the temperature of the hydrocarbon containing fluid leaving the convection section of the heat exchanger may then be regulated by the mixing rate of the heat exchanging fluids passing in the bypass line and/or the line comprising the external convection pipe(s).

BRIEF DESCRIPTION OF THE DRAWINGS

The invention will in the following be described in further detail by example embodiments with reference to the appended drawings, none of which should be construed as limiting the scope of the invention. I should be noted that the drawings are for illustrative purposes only. The dimensions of part and units shown in the drawings are not actual and only for illustration of principles. Any combination of the elements shown in each separate embodiment is envisaged and may be applied in order to obtain the similar effect in anther embodiment.

FIG. 3 shows a cross sectional side view of a heat exchanger unit of a second embodiment of a heat exchanger unit according to the invention.

DETAILED DESCRIPTION OF THE INVENTION

The term "process fluid" is meant to comprise any fluid that is cooled (or heated) by the heat exchanger in order to be processed or transported and possibly further processed later.

The term "hydrocarbon containing fluid" is meant to comprise any liquid or gas or mixtures thereof containing hydrocarbons, such as oil and/or gas from a production site, both without or with water in any amount.

The term "heat exchanger" is meant to comprise any device or system wherein a fluid is heated or cooled by convection with another fluid due to differences in temperatures.

Figure 1:
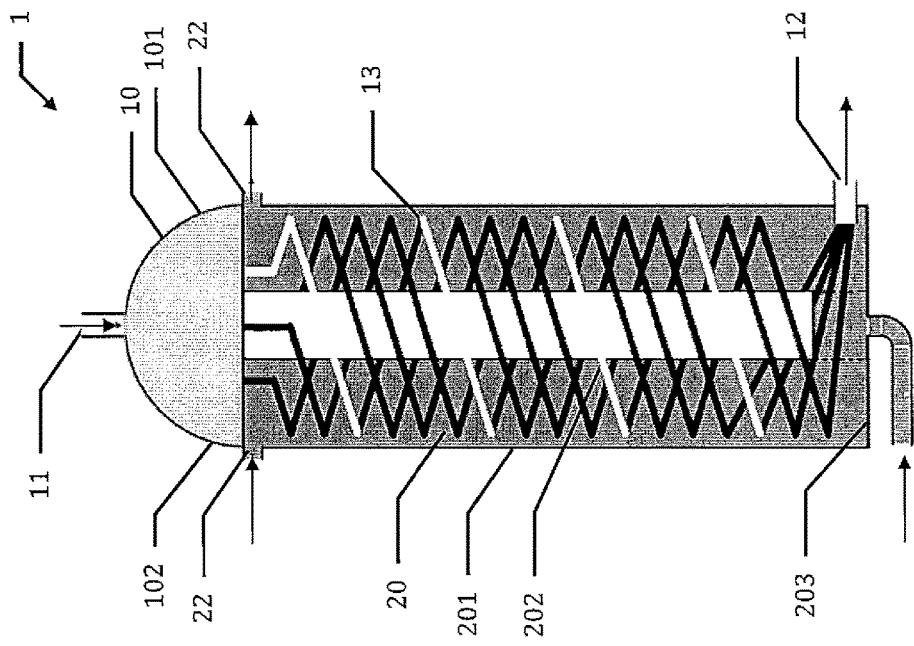
FIG. 1 shows a cross sectional side view of a first embodiment of a heat exchanger unit according to the invention.

FIG. 1 shows a cross sectional view of a first embodiment of the heat exchanger 1 according to the present invention. The heat exchanger 1 comprises a header 10 and a convection section 20 in a shell or enclosure, said header and convection section being sealed from each other by a partition 102. The volume of the header 10 is limited by an enclosure shell 101 and the partition 102 and receives process fluid through a process fluid inlet 11. The process fluid received by the header 10 is distributed through the partition 102 into one or more internal convection tubes 13 passing through the convection section 20 which is limited by a cylindrical shell or casing 201, a bottom wall 203 and said partition 102. The header 10 may be a distribution header which in the case of a process fluid containing an oil and gas mixture secures equal distribution of phases in each internal convection tube in order to avoid local concentration of phases in some tubes which might cause deposits.

The internal convection tubes 13 are bundled together in a process fluid outlet 12 at the opposite end of the convection section.

The layout of the internal convection tubes 13 inside the convection section 20 may vary, but are in this example assembled in a helical manner as shown in FIG. 1, such as in a helical spiral wound arrangement, wherein a large area of heat transfer may be enabled within a small volume of the convection section.

In a spiral wound heat exchanger the overall bundle is formed like a cylindrical device with tubes coiled up in circular layers. All tubes are coiled up with a fixed inclination angle. The final tube coils are arranged in different layers, where each level contains several tubes. The coiling direction of each layer may be the same, or alternating between the layers. All tubes have equal length. Radial and longitudinal pitch between tubes may be flexibly varied.

The convection section 20, being limited by the cylindrical casing 201, the bottom wall 203 and said partition 102, further comprises one or more heat exchanging fluid inlets 21, and one or more heat exchanging fluid outlets 22, wherein the heat exchanging fluid freely may pass over the helically bundled heat exchanging internal convection tubes 13. The heat exchanging fluid outlets 22 may be oriented in longitudinal direction or radial direction, and several outlets are preferable when directed in the radial direction, to avoid immobilised flow regions in parts of the convection section 20.

As shown in FIG. 1, the exemplified heat exchanger of this embodiment is placed vertically and operated in a counter current mode, wherein the heat exchanging fluid inlet 21 is placed close to the sea floor and the heat exchanging fluid outlets 22 are positioned at the top part of the heat convection section 20. The process fluid enters from the topside by the inlet 11 of the heat exchanger 1 and is extracted at the bottom part of the convection section 20 by outlet 12. The vertical positioning of the heat exchanger enables easy draining of liquids in the heat exchanger during shutdowns.

The convection section 20 of the heat exchanger 2 may preferably comprise a flow diversion element 202 or turbulence element such as a shroud, positioned in the centre interior of the convection section 20 to direct the heat exchanging fluid more directly over the internal convection tubes and hinder it passing directly through the middle of the spiral arrangement of said tubes. The diversion element 202 can have any suitable shape, and has in this embodiment a cylindrical shape centred in the middle of the convection section with a length shorter than said section, positioned in a vertical distance from the heat exchanging fluid inlet and connected to the partition 102 at the top of the section. This arrangement directs the heat exchanging fluid to the more peripheral areas at the bottom and up over the internal convection tubes 13 and thereafter out to the topside outlets 22. The diversion element 202 may also provide structural strength to the unit and may be used as support for the internal convection tubes 13 inside the heat exchanger. Any suitable diversion elements and/or baffles may be used to direct the flow of the heat exchanging fluid in an optimal fashion.

Figure 2:
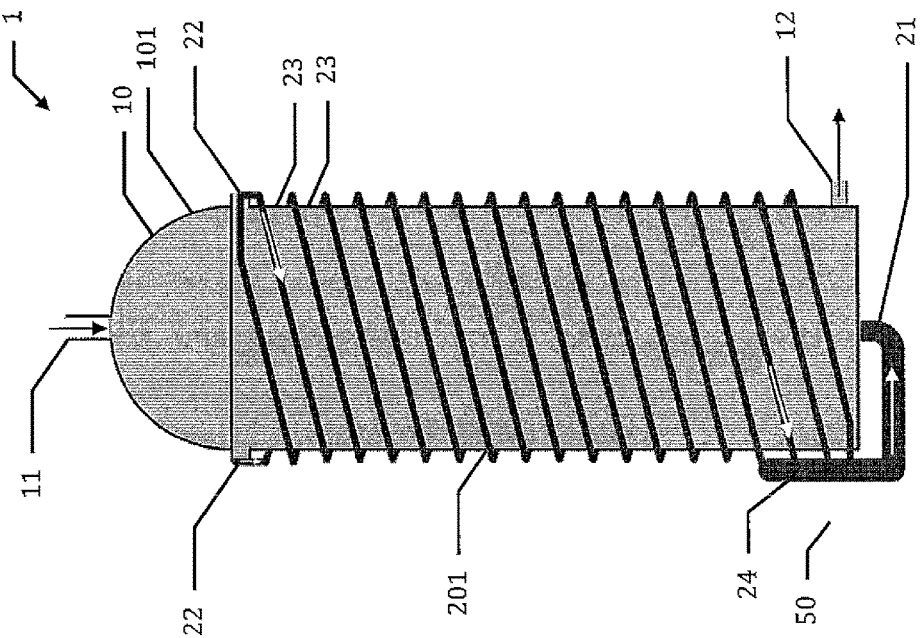
FIG. 2 shows a side view of the heat exchanger unit in FIG. 1.

FIG. 2 shows an external side view of the heat exchanger 1 in FIG. 1. The heat exchanging fluid exiting the convection section 20 by the top outlets 22 is lead in external convection pipes 23 arranged in a serpentine manner on the outside of the heat exchanger tank 1 on cylindrical casing 201 towards the bottom end where they are collected in an inlet pipe 24 before entering the heat exchanger again through the heat exchanging fluid inlet 21. The number of external convection pipes 23 preferably corresponds to the number of outlets 21. The heat transfer between the casing 201 and the external convection pipes 23 is negligible. The heat transfer between casing 201 and the surrounding sea water can contribute to the overall heat transfer.

In the mode shown in this embodiment, the heat exchanger 1 is used for cooling a process fluid by heat exchanging with a heat exchanger or cooling fluid circulating in a closed circuit or loop. In this mode, natural convection inside the convection section 20 contributes to an increase in buoyancy of the cooling fluid, which induces upward flow of the cooling fluid. The cooling fluid, being warmed up as the counter streaming process fluid heats it, provides circulation of the cooling fluid from the bottom to the top.

With the use of a closed circuit for the heat exchanging fluid, any suitable fluid may be used, for example seawater or glycol. Hence, the heat exchanging fluid may have inherent properties or be provided with properties, such as by additional substances, suitable for enhancing the heat exchanging process, for example in avoiding internal scaling and growth or avoiding or enabling phase change of the heat exchanging fluid.

In the same manner that the heat exchanging fluid is heated and rise in the convection section 20 inside the tank 1, the external convection pipes 23 will heat the seawater surrounding the heat exchanger tank 1 and the seawater will rise due to an increase in buoyancy. This will enhance circulation of the seawater as the seawater rise and is replaced by cold seawater. The circulation of seawater may provide a certain counter current heat exchange on the outside of the tank 1, cooling the heat exchanging fluid before it enters the convection section 20 of the heat exchanger 1 again. Normally, sea current will provide an important flow of seawater across the external convection pipes 23 providing convection thereof.

In order to control the outlet temperature of the process fluid, the circulation of heat exchanging fluid is controlled. The temperature control may be obtained by flow rate control of the heat exchanging fluid in order to regulate the transfer of heat between the two fluids. Preferably, a circulation means in the form of a pump 50 is used to control the flow rate of the heat exchanging fluid. Alternative circulations means could be any of a propeller or ejector within the convection section 20 for forced circulation of the heat exchanging fluid across the internal convection tubes 13.

FIG. 3 shows another embodiment of the present invention in a cross sectional view. The heat exchanger tank 2 comprises a convection section 40 limited by a cylindrical shell or casing 401, a bottom wall 403 and a top wall 404, and having a process fluid inlet 31 distributing said process fluid in one or more internal convection tubes 33 passing through the convection section 40 and being bundled together in a process fluid outlet 32. The process fluid inlet 31 and outlet 32 may have any form and position of connection on the heat exchanger tank 2, for example as shown in FIG. 1, but are in this embodiment positioned with the process fluid inlet 31 and outlet 32 at the top and bottom part respectively of the cylindrical casing 401. The process fluid inlet may also comprise or be connected to a distribution header, such as shown in FIG. 1, for distributing the process fluid into the internal convection tubes 33.

The layout of the internal convection tubes 33 inside the convection section 40 may be assembled in a helical manner as shown in FIG. 3, similar to the arrangement described above and shown in FIG. 1, or any other suitable arrangement.

The convection section 40 further comprises a heat exchanging fluid inlet 41 and outlet 42 in the centre bottom and top part respectively, of the convection section. The heat exchanging fluid may freely pass over the helically bundled heat exchanging internal convection tubes 33. In order to hinder said heat exchanging fluid passing directly through the middle of the spiral arrangement of said internal convection tubes 33, a diversion element 402, shroud or turbulence element is positioned in the centre interior part of the convection section 40 to direct said fluid more directly over said tubes. The diversion element 402 may have any suitable shape, and is in this embodiment a cylindrical shape positioned in the middle of the convection section 40 with a length shorter than said section and positioned in a vertical distance from both the heat exchanging fluid inlet 41 and outlet 42. The diversion element directs the heat exchanging fluid out to the more peripheral areas of the convection section 40 at the bottom and up over the internal convection tubes 33, and thereafter back towards the centre again at the top of the convection section 40 towards the outlet 42.

The heat exchanger 2 exemplified in FIG. 3 is also placed vertically and operated in a counter current mode as described above, wherein the heat exchanging fluid inlet 41 is placed close to the sea floor and the outlet 42 is positioned at the top of the heat convection section 40. The process fluid enters from the top part of the heat exchanger 2 through process fluid inlet 31 and is extracted at the bottom part of the convection section 40 through process fluid outlet 32. In this embodiment both the inlet 31 and outlet 32 are positioned at radial positions on the side of the heat exchanger 2.

As shown in FIG. 3, the heat exchanging fluid exiting the convection section 40 by the top outlet 42 is distributed to an external convection circuit 3. The convection circuit 3 may comprise an arrangement for increasing contact area with the seawater, in this example in the form of several external convection pipes 43 arranged in parallel, allowing seawater to surround said pipes and flow in-between. The heat exchanging fluid is cooled while flowing through the convection circuit 3, and especially by flowing through said convection pipes 43 before being collected and lead into the heat exchanger 2 through the inlet 41. The heat exchanging fluid may be transported through the convection circuit 3 from the outlet 42 by a pipe 44, via a pump 60 and a second pipe 45 to the external convection pipes 43 through one or more splits. Said external convection pipes 43 may be arranged in any suitable manner, such as one or more of vertical parallel pipes, horizontal or slanted parallel pipes, or helical spiral arrangements such as those described on the inside or outside of the heat exchanger 1, 2 and shown in further detail in FIGS. 4 and 5. The separate convection pipes 43 are then joined and the heat exchanging fluid is lead by a pipe 46 to the inlet 41.

In the mode of this embodiment, the heat exchanger 2 is used for cooling a process fluid by heat transfer with a heat exchanger convection fluid. This mode induces a natural convection inside the convection section 40 contributing to buoyancy inside the section as described above.

The external convection pipes 43 will likewise heat the seawater surrounding them and in the case of still seawater contribute to circulation of the seawater as it is warmed up and replaced by cold seawater. However, prevailing currents of seawater may often contribute to a more important flow of seawater across the external convection pipes 43 in a generally horizontal direction. The circulation may provide a certain counter current heat exchange on the outside of the pipes 43, depending on the orientation of the pipes in relation to existing or generated seawater flow, cooling the heat exchanging fluid before entering the convection section of the heat exchanger again. The flow of seawater around the arranged external convection pipe 43 may also be enhanced and partly controlled by a flow device 70, such as a propeller as shown in FIG. 3, for forced and partly controllable flow of seawater around the external pipes 43, such as in an upward and/or cross oriented flow to obtain both natural convection and forced convection.

In FIG. 3 a propeller, forcing seawater across the external parallel pipes 43, exemplifies the flow device 70. Likewise an ejector system for circulating seawater may be used, providing seawater flow through the bundle, by high-pressure seawater being pumped through a single main pipe where secondary seawater is ejected into the flow. The main sea water supply system then has high pressure and low volumetric flow, reducing pump capacity (but increasing pump head). The flow rate of seawater may be controlled to a certain extent and thereby controlling heat transfer, temperature profile and inlet temperature of the heat exchanging fluid to the convection section. A pump system supplying power to the ejector system may be used.

In order to control the outlet temperature of the process fluid at outlet 32, the circulation of heat exchanging fluid may be controlled. The temperature control may be obtained by flow rate control of the heat exchanging fluid in order to regulate the transfer of heat between the two fluids. A pump 60 may control the flow rate of the heat exchanging fluid, securing correct heat transfer rate between the heat exchanging fluid and the process fluid. The temperature of the heat exchanging fluid is further adjustable by the flow device 70 which may provide increased convection and thereby an increased temperature difference of the heat exchanging fluid from outlet to inlet. Alternatively or in addition, the flow device 70 may contribute in keeping the inlet temperature of the heat exchanging fluid at inlet 41 constant by increasing or decreasing seawater flow over the pipes 43 in adjustment to changes in sea temperature and especially changes in currents.

The external convection circuit 3 may also comprise a hydrostatic equalizer 61 to pressurize the inside of the pipe members of the convection circuit so that the internal pressure is balanced with the seawater on the outside. In addition the convection circuit 3 may optionally comprise a buffer tank for heat exchanging fluid (not shown). Differences in pressure on the inside of subsea pipes and tubing or any equipment necessitate thick walled elements to withstand the hydrostatic pressure of the seawater at the actual sea depth. By pressure balancing the pipes and tubes and other elements of the external convection circuit, and especially the external convection pipes, the thickness of said pipes may be reduced and more effective cooling is obtained with the seawater. Also, such pressure balancing allows for the use of other pipe materials than steel, such as for example aluminum.

In order to further control the cooling of the heat exchanging fluid, a bypass line 47 of the convection circuit 3 with the external convection pipes 43 may be present, with a flow controlling valve 48 regulating the amount of fluid bypassing the external convection pipes 43. The amount of heat exchanging fluid passing through the bypass line 47 will influence the final temperature of the heat exchanging fluid entering the convection section 40 at inlet 41 as the fluids from the bypass 47 and fluid having been cooled further in the external convection pipes 43 are mixed in rates depending on the controlling valve 48. Hence the circulation pump 60 may run at constant speed while the valve 48 controls the resulting temperature at the inlet 41. With a seawater temperature in the range of 0-4° C. the inlet temperature of the heat exchanging fluid may for example be adjusted to be within a temperature interval of about 15-25° C. The bypass 47 is also advantageous in the case of possible leaks in the system, such as in the external convection pipes 43.

Figure 4:
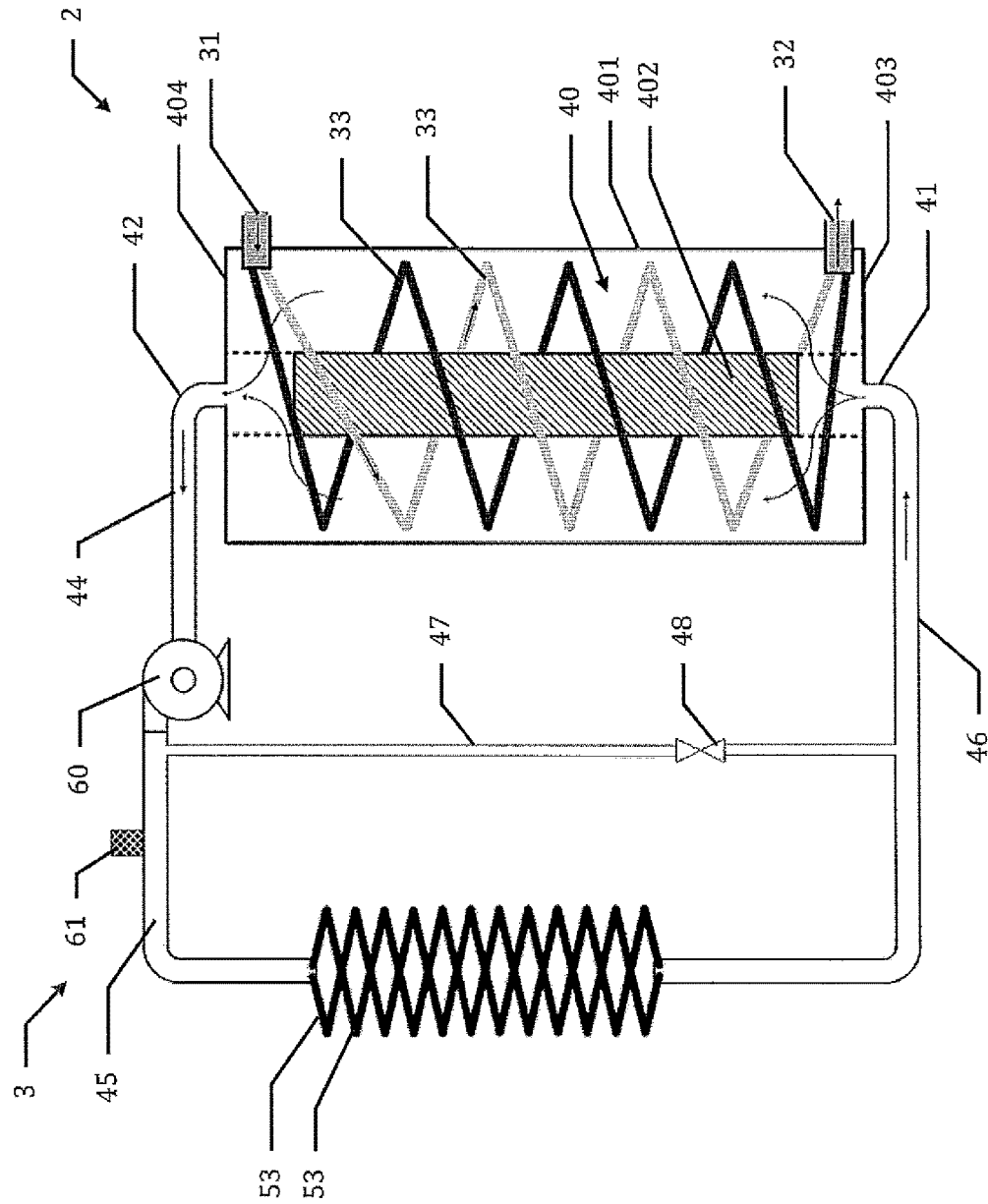
FIG. 4 shows a cross sectional side view of a heat exchanger unit of a third embodiment of a heat exchanger unit according to the invention.

FIG. 4 shows a heat exchanger similar to FIG. 3 wherein the external convection pipes 53 of the convection circuit 3 are arranged in a helical spiral manner as a vertical tube in a vertical position. In this configuration the seawater may be heated and contribute to circulation over the pipes and through the tube form of the pipe arrangement, due to increase in buoyancy as the seawater is warmed up and replaced by cold seawater.

An optional bypass line 47 of the external convection pipes 53 with a flow-controlling valve 48 regulating the amount of fluid bypassing the external convection pipes 53 is also shown. The valve 48 provides the possibility to account for differences in temperature and currents of the seawater affecting the final temperature of the fluid exiting the external convection pipes 53, when no flow device is present to adjust seawater flow around the external convection pipes 53.

Figure 5:
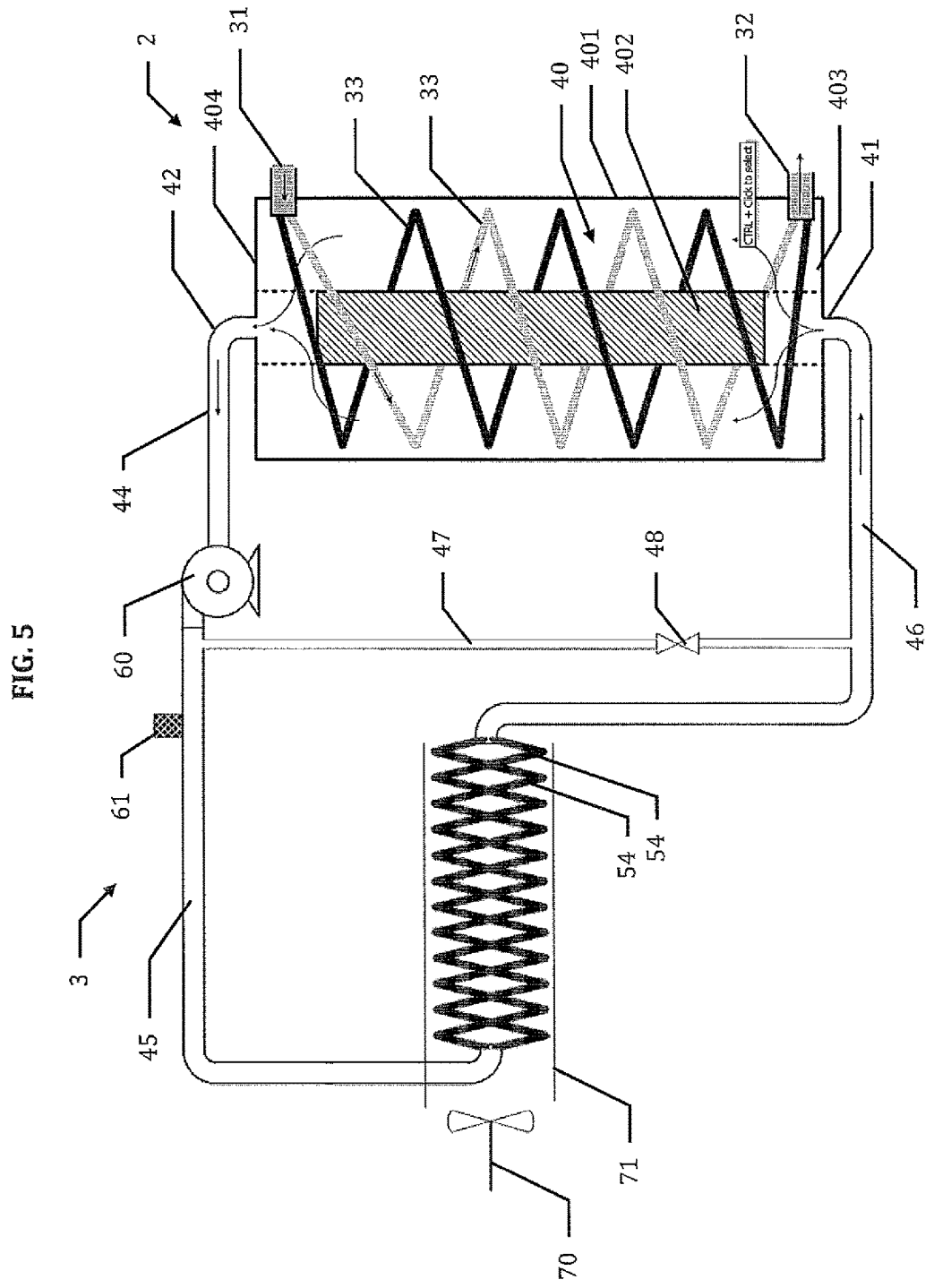
FIG. 5 shows a cross sectional side view of a heat exchanger unit of a forth embodiment of a heat exchanger unit according to the invention.

FIG. 5 shows a further embodiment of a heat exchanger similar to FIGS. 3 and 4 wherein the external convection pipes 54 of the convection circuit 3 also are arranged in a helical spiral manner as a tube, but wherein the tube is positioned in a horizontal manner.

In order to obtain further control of the cooling or heating effect of the external convection pipes 54, the pipes are in this embodiment partly encased in an optional cylindrical casing 71 with open ends, wherein seawater flow over external convection pipes 54 is controlled by a flow device 70. A propeller here exemplifies the flow device 70, but an ejector or similar device may also be used for forced flow of seawater over and around said convection pipes 54 for forced convection. In a further embodiment, the casing 71 may also comprise baffles or devices to close and open one or both the end openings of the casing (not shown), such as to further control through flow, or for closing the casing 71 such as for cleaning purposes.

As mentioned above, the heat exchanger of the present invention may also be used for heating process fluids, by heat exchanging with seawater warmer than the process fluid.

Figure 6:
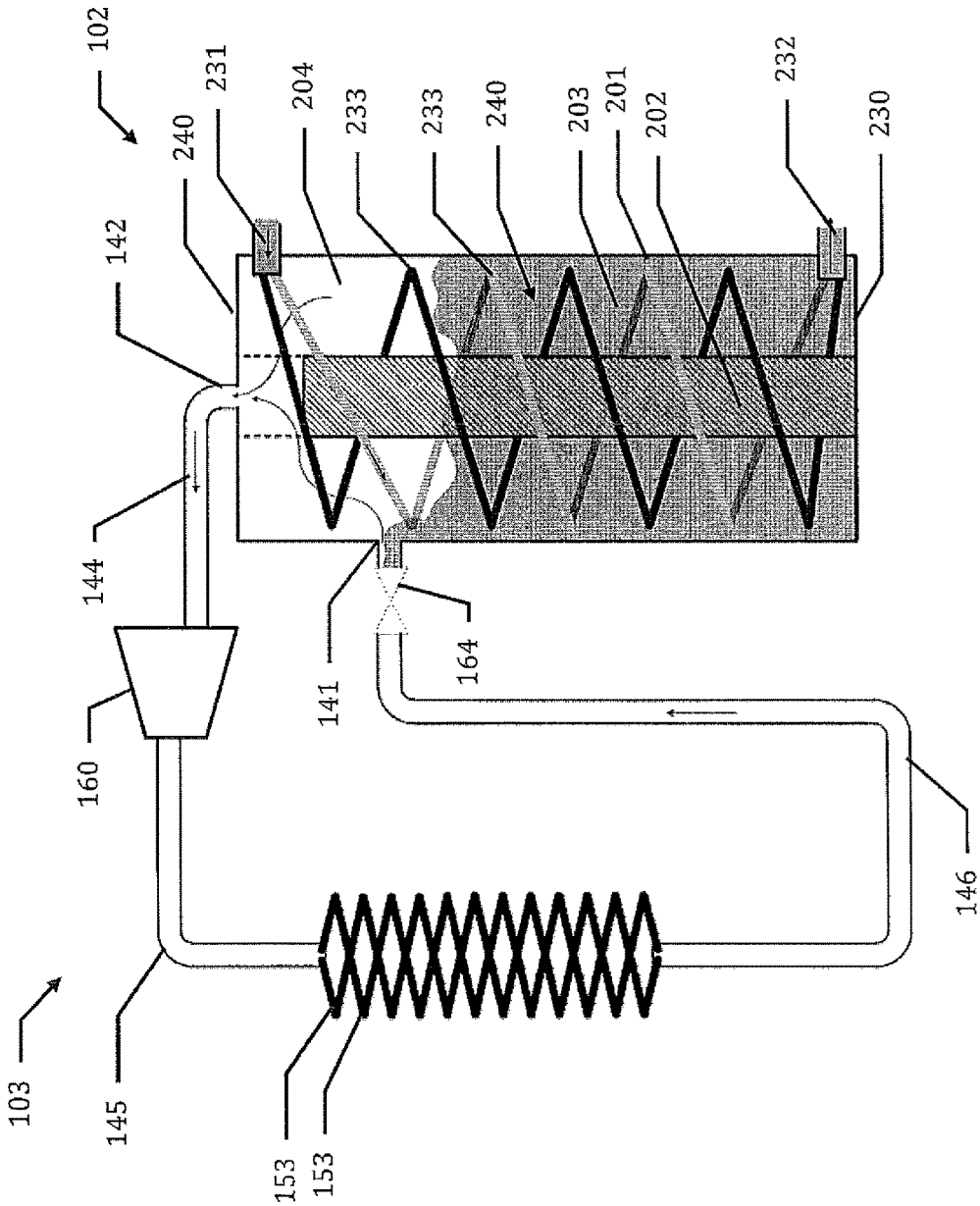
FIG. 6 shows a cross sectional side view of a heat exchanger unit of a fifth embodiment of a heat exchanger unit according to the invention.

FIG. 6 shows a further embodiment of a heat exchanger according to the present invention wherein a heat exchanger 102 with convection circuit 103 may be used as a vapour compression refrigeration system. The heat exchanger 103 is similar to the heat exchangers of the former embodiments of FIGS. 3, 4 and 5 except for a heat exchanging fluid inlet 141 positioned on the side wall of its casing 201, at a vertical distance from the bottom of said heat exchanger 102, instead of at the bottom. The convection circuit 103 is also similar to the embodiment of FIGS. 3, 4 and 5, but comprises a compressor 160 instead of a pump and in addition an expansion valve 164 on the convection circuit before heat exchanging fluid inlet 141 of the heat exchanger. Hence, in the present embodiment, the heat exchanger and convection circuit is adapted for using a refrigerant circulating as heat exchanging fluid, for example propane.

The heat exchanger 102 functions as an evaporator. By exchanging heat with the refrigerant, which is evaporated, the process fluid running through the internal convection tubes 233 is cooled. The gas phase refrigerant vapour leaves the convection section 240 of the heat exchanger 102 by the heat exchanger fluid outlet 142 and fed by a pipe 144 to the compressor 160 where the vapour is compressed. The compressed vapour gas is transported to an arrangement of external convection pipes 153 by a pipe 145. In this embodiment the external convection pipes 153 of the convection circuit 103 are arranged in a helical spiral manner as a vertical tube in a vertical position as in FIG. 4. The arrangement of the convection pipes may however have any form which is suitable, for example any of the above mentioned set ups or other suitable arrangements.

The external convection pipes 153 function as a condenser wherein the compressed refrigerant vapour is condensed to mainly comprising a liquid by the heat exchange with the cool seawater.

The liquid refrigerant from the convection pipes 153 is transported by a pipe 146 to said expansion valve 164 from which the refrigerant exits as a two-phase fluid mixture and enters the convection section 240 of the heat exchanger 102 by the inlet 141. Said inlet may be positioned above the liquid level of the refrigerant in the heat exchanger as shown in FIG. 6, leaving the heat exchanging tubes 233 partly immersed in the liquid phase 203 of the refrigerant, and space for the refrigerant vapour 204 in a top part of the convection section 240.

The process described above will function even with varying effect on the external convection pipes 153 towards the seawater as the variation in cooling will give rise to a variation in the ratio of gas and liquid from the expansion valve. The temperature of the stream entering the convection zone 240 by inlet 141 will be constant and the cooling of the hydrocarbon fluid may be controlled by regulating the circulation rate of the compressor 160 to account for variations in cooling from the sea currents.

The convection system described above may for example be use as a second stage in the cooling of hydrocarbon fluid where essentially most of the water has been knocked out by an earlier cooling and separation stage. The unit and the process may for example be used to reduce the dew point of a hydrocarbon gas below the seawater temperature, such as for producing dry sales gas.

Example

A cooling system according to the embodiments of FIGS. 3-5 may receive a warm hydrocarbon gas produced from a subsea well at about 100 bar and 80° C. in the amounts of about 60 kg/s. An inlet passes said gas to the internal convection section of the heat exchanger and passes the gas on the inside of the convection tubes thereof where the gas may be cooled down to an exit temperature of about 25° C. The heat exchanging fluid, in this case water in the amount of about 55 kg/s enters the heat exchanger at about 15° C. and 30 bar and passes over the outside surface of said convection tubes within the heat exchanger casing through the internal convection section thereof and is heated to an exit temperature of about 60° C. The heat exchanging fluid is then directed through the external convection circuit where it is cooled down to about 15° C. before entering the internal convection section. The amount of seawater at about 4° C. and 30 bar necessary for obtaining the mentioned cooling of the heat exchanging fluid is order of 3500 kg/s which passes over the external circuit, and especially the convection pipes, either by natural current or by forced flow by the use of a flow device as mentioned in the embodiment above.

Compared to subsea heat exchangers of prior art wherein seawater is used in direct contact with convection tubes carrying the process fluids, the present invention makes use of a closed circuit containing a heat exchanging fluid for heat transfer with said convection tubes and which in turn exchanges heat with the sea water by external convection tubes. Hence, the surface temperature of the external convection circuit, i.e. pipes 23, 43, 53, 54 and 154 is reduced compared to the surface temperature of the internal tubes 13 and 33 and may be held below the temperature at which scaling occurs and at a temperature where marine growth and corrosion is reduced. In addition, the external positioning of the external convection circuit may enable physical scraping and removal of marine fouling and improved fouling control.

The present invention therefore also increases control of fouling and hence limits the need for overcapacity in construction of subsea heat exchangers and provides a more precise control of the temperature.

Most prior art subsea coolers are of the passive type, or have only limited means of controlling direct flow of seawater across the hydrocarbon fluid containing heat-exchanging tubes. The lack of exactness of temperature control of these former coolers therefore limits the temperature level at said coolers safely may cool a hydrocarbon fluid to without risking hydrate or other deposits.

The invention provides the possibility to control fluid temperature on the tube side (such as hot fluid) at all turndown rates, and may use either forced convection or free convection on the seawater side. The temperature of the process flow is controllable and the risk of hydrate formation is considerably reduced.

The closed circuit allows for more complex tube arrangements as well as deviation elements and baffles inside the convection section of the heat exchanger, as scaling and marine growth is eliminated. The heat exchanging fluid may be water or any mixture of water or glycol or any mixtures thereof and may contain scaling and growth inhibitors such as biocides or cleaning chemicals that keep the closed circuit free of contaminants and deposits.

It should be noted that the process fluid, which in general will be a hydrocarbon containing fluid is preferably run through the convection tube side of the internal convection tubes 13 and 33 in order to obtain a homogenous cooling of the fluid, although the opposite is possible by running the closed circuit connected with heat exchanging fluid to the internal convection tubes 13 or 33 for a moderate heat exchange. The criteria for this opposite operation mode would be that the hydrocarbon containing fluid is not cooled below any wax and/or hydrate formation temperature, and hence would not allow any precise control as the temperature within the convection section vary with regard to distance and contact with the internal convection tubes.

The invention claimed is:

1. A subsea heat exchanger for cooling or heating a hydrocarbon-containing fluid, said heat exchanger comprising;
    a convection section enclosed by a shell or enclosure comprising:
        one or more heat exchanging fluid inlet(s) and outlet(s);
        one or more hydrocarbon-containing fluid inlet(s) and outlet(s); and
        one or more fluid carrying convection tube(s) adapted for heat transfer between the hydrocarbon-containing fluid on the inside of the tube(s) and a surrounding heat exchanging fluid on the opposite side of the tube(s), wherein the heat exchanger is provided with one or more flow regulating device(s) configured to control a hydrocarbon-containing fluid outlet temperature, wherein the heat exchanging fluid circulates in a closed circuit for heat transfer both with said hydrocarbon-containing fluid and with surrounding sea water on an outside of the enclosure, wherein the one or more flow regulating device(s) are mechanical devices with moving parts, wherein the one or more flow regulatory device(s) are configured to maintain a temperature at the hydrocarbon-containing fluid outlet above a wax or hydrate formation temperature of the hydrocarbon-containing fluid, and wherein the closed circuit comprises one or more external convection pipes adapted for heat transfer between the heat exchanging fluid on the inside of the pipes and surrounding sea water on the opposite side of the pipes.

2. The heat exchanger according to claim 1, wherein the flow regulating device is a pump or a compressor regulating the flow rate of heat exchanging fluid.

3. The heat exchanger according to claim 1, wherein the convection tube(s) inside the convection section are coiled in a helical manner.

4. The heat exchanger according to claim 1, wherein the heat exchanger is positioned vertically.

5. The heat exchanger according to claim 1, wherein two or more external convection pipes are arranged in an arrangement selected from the group consisting of: a free standing parallel arrangement in a horizontal, vertical or slanted arrangement; a helical arrangement in a free standing manner; and coiled around the heat exchanger enclosure.

6. The heat exchanger according to claim 1, wherein the flow regulating device is a propeller or ejector for increasing flow of surrounding seawater across the external convection pipes, optionally wherein the convection pipes are bundled within an open ended cylindrical casing.

7. The heat exchanger according to claim 1, wherein the hydrocarbon-containing fluid and heat exchanging fluid flow in a co-current or counter current manner.

8. The heat exchanger according to claim 1, wherein the heat exchanging fluid flow can be reversed.

9. The heat exchanger according to claim 1, wherein the external convection pipes and/or the internal convection tube(s) are equipped with an electrical heating.

10. The heat exchanger according to claim 1, wherein the heat exchanger comprises a distribution header at the inlet of the hydrocarbon containing fluid.

11. The heat exchanger according to claim 1, wherein the closed convection circuit comprises a bypass circuit bypassing the external convection pipes.

12. The heat exchanger according to claim 11, wherein the flow regulating device is a valve in the bypass circuit regulating the mixing rate of heat exchanging fluid passing through the external convection pipes and the bypass circuit.

13. The heat exchanger according to claim 1, wherein the hydrocarbon-containing fluid is mainly a gas.

14. The heat exchanger according to claim 1, wherein the flow device is a compressor and the closed circuit comprises an expansion valve.

15. A method for subsea cooling or heating of a hydrocarbon containing fluid comprising:

passing said hydrocarbon containing fluid through one or more convection tubes in an enclosed convection section of a subsea heat exchanger; and passing a heat exchanging fluid around said convection tubes within said enclosed convection section in order to cool or heat the hydrocarbon containing fluid;

circulating said heat exchanging fluid in a closed circuit through seawater on an outside of the enclosed convection section in order to cool or heat the heat exchanging fluid before entering the enclosed convection section of the heat exchanger again, wherein a temperature of the hydrocarbon containing fluid leaving the convection section of the heat exchanger is regulated by one or more flow regulating device(s) that are mechanical devices with moving parts, wherein the controlling of the hydrocarbon-containing fluid outlet temperature comprises maintaining a temperature at the hydrocarbon-containing fluid outlet above a wax or hydrate formation temperature of the hydrocarbon-containing fluid, and wherein the heat exchanging fluid is passed through one or more external convection pipes of the closed circuit in seawater on the outside of the enclosed convection section.

16. The method according to claim 15, wherein the temperature of the hydrocarbon containing fluid leaving the convection section of the heat exchanger is regulated by forcing a current of seawater around said external convection pipes.

17. The method according to claim 15, wherein some of the heat exchanging fluid passing in the closed circuit through seawater is passed through a bypass line, bypassing the one or more external convection pipes, and wherein the mixing rate is regulated by at least one valve in the bypass line and/or the line comprising the external convection pipe(s).

18. The method according to claim 17, wherein the temperature of the hydrocarbon containing fluid leaving the convection section of the heat exchanger is regulated by the mixing rate of the heat exchanging fluids passing in the bypass line and/or the line comprising the external convection pipe(s).

19. The method of claim 15, wherein the method for cooling or heating a hydrocarbon containing fluid occurs at a subsea location.

* * * * *